(No Model.)
J. A. STONE.
COMBINATION TOOL.
No. 342,884. Patented June 1, 1886.
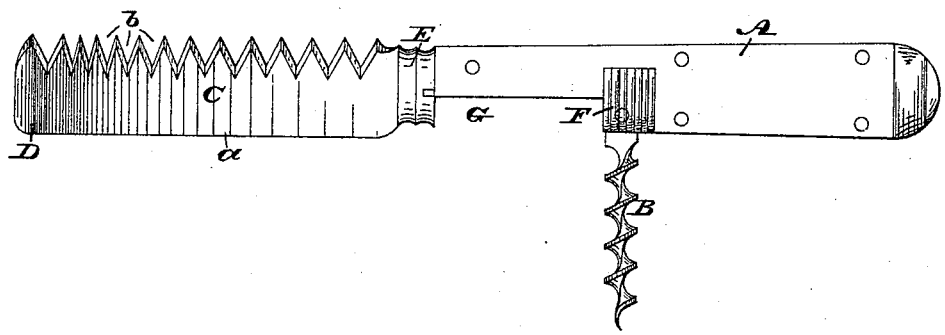
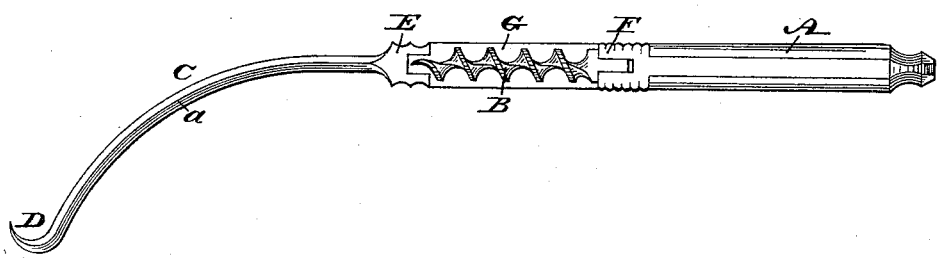
WITNESSES:
A. F. Grant,
W. F. Kircher
INVENTOR:
John A. Stone,
BY John A. Wiedersheim
ATTORNEY.

UNITED STATES PATENT OFFICE.

JOHN A. STONE, OF PHILADELPHIA, PENNSYLVANIA.

COMBINATION-TOOL.

SPECIFICATION forming part of Letters Patent No. 342,884, dated June 1, 1886.

Application filed September 17, 1885. Serial No. 177,363. (No model.)

*To all whom it may concern:*

Be it known that I, JOHN A. STONE, a subject of Great Britain, residing in the city and county of Philadelphia, State of Pennsylvania, have invented a new and useful Improvement in Combination-Tools, which improvement is fully set forth in the following specification and accompanying drawings, in which—

Figures 1 and 2 are side elevations of a combination-tool embodying my invention.

Similar letters of reference indicate corresponding parts in the two figures.

My invention consists of a combination-tool embodying a green-corn grater, vegetable-parer, and gouge, and a corkscrew.

Referring to the drawings, A represents a handle, to which is pivoted a corkscrew, B.

C represents a curved blade, which is connected with the handle A at the bolster end thereof, the same having one edge, $a$, sharpened, and the other edge, $b$, serrated. The outer end of the blade is bent, forming a scoop or gouge D.

The handle A has two bolsters, E F, the bolster E being at the end of the handle where the blade is connected, and the other bolster, F, is between the ends and forms the bearings for the pivot of the corkscrew B. The handle is cut away between the bolsters, leaving a space into which the corkscrew may be folded, its point entering between the side pieces of the relative bolster, so as to prevent lateral play of the screw and guard the hand from injury when grasped with the handle A during the use of the blade C.

It will be seen that green corn may be readily grated by the serrated edge $b$, and such corn and other vegetables cut by the edge $a$, the latter also being serviceable for paring and slicing vegetables generally.

The gouge D is employed for removing eyes, specks, &c., from potatoes and other vegetables. The use of the corkscrew is apparent. It is drawn out of the space G, as shown in Fig. 1, and operated by the handle A. When not required, it is returned to the space G, and does not affect the use of the handle as such when the knife or blade is in service.

Having thus described my invention, what I claim as new, and desire to secure by Letters Patent, is—

1. A blade curved transversely to its breadth, and having a serrated edge integral therewith, and a sharpened edge, substantially as described.

2. A curved blade having a sharpened edge, $a$, a serrated edge, $b$, opposite thereto, and a gouge, D, at the end thereof, substantially as and for the purpose set forth.

JOHN A. STONE.

Witnesses:
JOHN A. WIEDERSHEIM,
JNO. K. PLITT.